May 18, 1954 — A. SIMONSEN — 2,678,745
SELF-DUMPING ELEVATOR
Filed Oct. 4, 1951 — 4 Sheets-Sheet 1
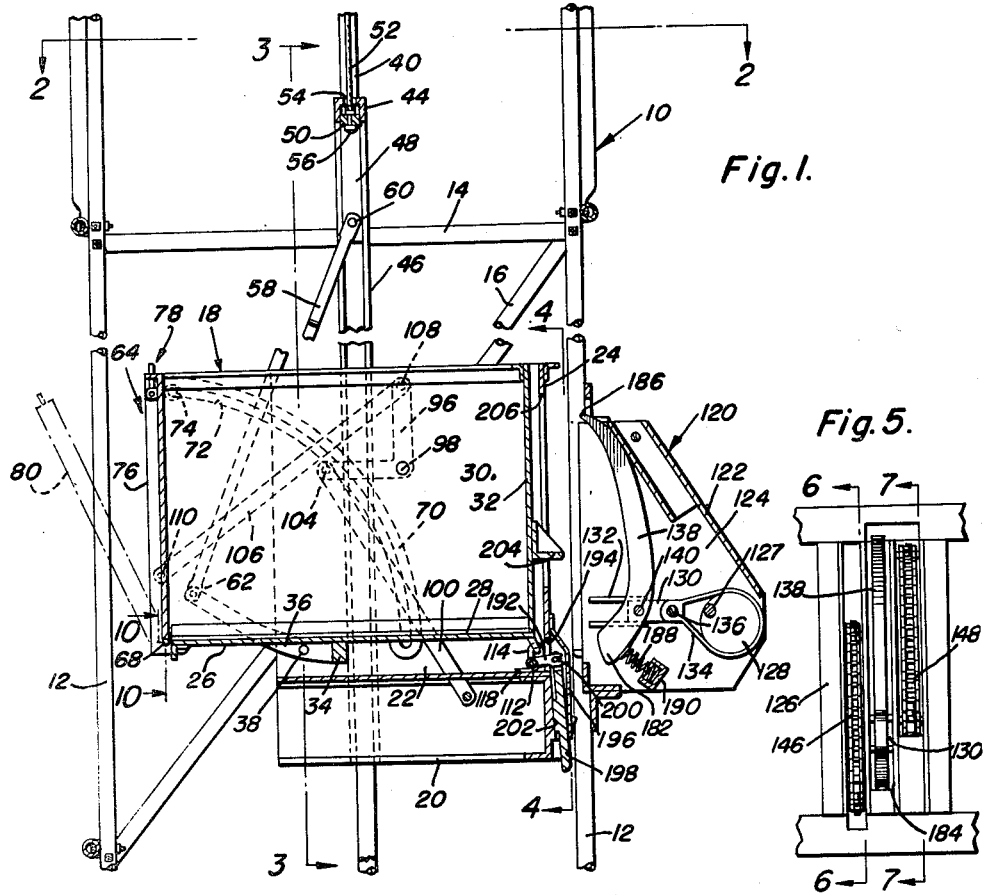
Fig. 1.
Fig. 5.
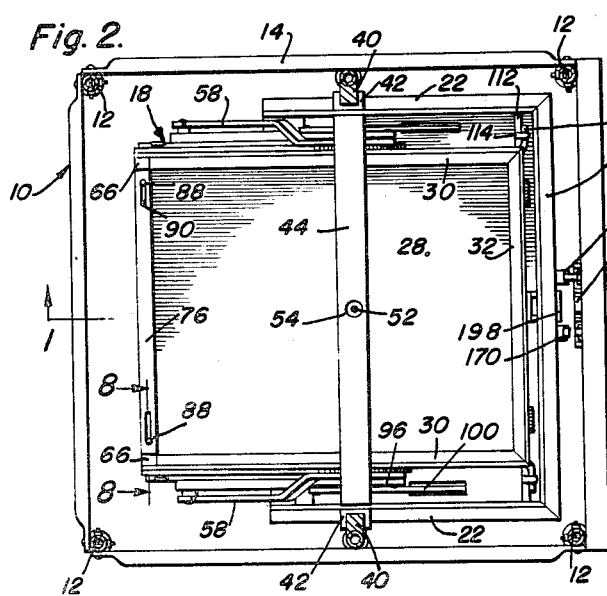
Fig. 2.
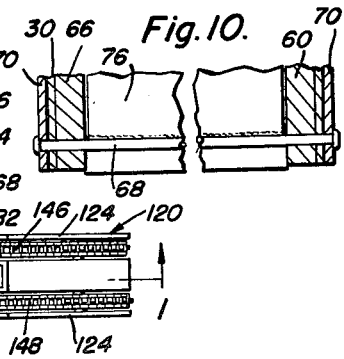
Fig. 10.
Arnold Simonsen
INVENTOR.
BY
*Attorneys*

May 18, 1954   A. SIMONSEN   2,678,745
SELF-DUMPING ELEVATOR
Filed Oct. 4, 1951   4 Sheets-Sheet 2
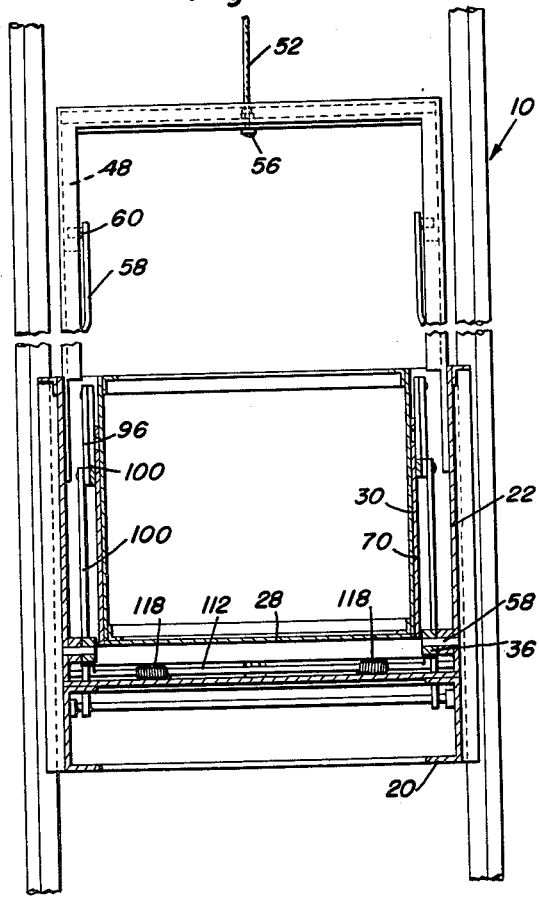
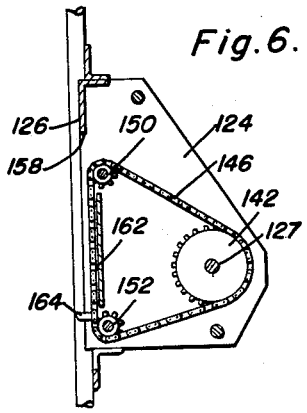
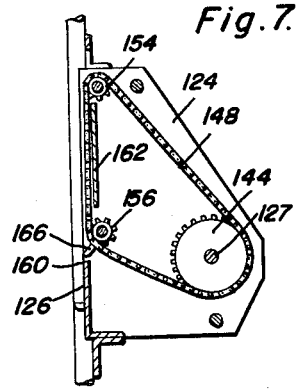
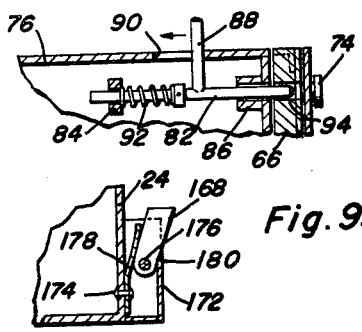
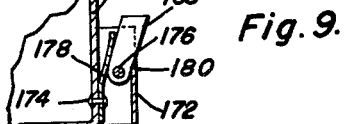
Arnold Simonsen
INVENTOR.

May 18, 1954  A. SIMONSEN  2,678,745
SELF-DUMPING ELEVATOR
Filed Oct. 4, 1951  4 Sheets-Sheet 3

Arnold Simonsen
INVENTOR.

May 18, 1954　　　A. SIMONSEN　　　2,678,745
SELF-DUMPING ELEVATOR
Filed Oct. 4, 1951　　　　　　4 Sheets-Sheet 4

Arnold Simonsen
INVENTOR.

BY *Clarence A. O'Brien and Harvey B. Jacobson*
Attorneys

Patented May 18, 1954

2,678,745

UNITED STATES PATENT OFFICE 2,678,745

SELF-DUMPING ELEVATOR

Arnold Simonsen, San Francisco, Calif.

Application October 4, 1951, Serial No. 249,693

8 Claims. (Cl. 214—713)

This invention relates to new and useful improvements in apparatus for handling materials, and more particularly pertains apparatus for moving material to and discharging such material at a selected position.

The primary object of this invention is to devise apparatus for moving materials along a travel path to an arbitrarily selected one of a plurality of spaced discharge positions along the travel path, and to discharge such material at the selected position solely by appropriate movements of the material holding structure along the travel path adjacent the discharge station.

Although the principles of this invention will find more general application, such as in railway coal car dumping assemblies and other horizontal organizations, it is specifically an object of this invention to devise an apparatus for moving materials vertically from a loading position and for discharging such material at arbitrarily selected positions either above or below the loading position.

Another important object of this invention is to provide cooperating carrier discharging apparatus on the carrier and on the carrier guide structure, which will be ineffective to discharge the carrier when the carrier moves upwardly or downwardly past the discharging station, but which will discharge the carrier when the latter is moved upwardly and downwardly in a particular manner at such discharge station.

A meritorious feature of the present invention resides in the means provided for supporting the carrier assembly in such a manner that the weight of the assembly normally acts to hold the carrier in load holding position.

Another important feature of the present invention closely allied to the preceding feature resides in the provision of means for tilting the carrier in response to downward movement of the carrier assembly due to the action of transference of some of the weight of the carrier assembly to such means.

Another important feature of the present invention resides in the provision of a openable closure member for the tiltable carrier, together with structure for opening such closure in response to tilting of the carrier to discharging position.

The final and important feature of the present invention to be specifically enumerated herein resides in the discharging structure adapted to be secured to the elevator frame, together with cooperating structure on the carrier assembly for rendering the same operative to cause the carrier to tilt to discharging position.

These and other objects and features of the present invention will later become apparent as the following description proceeds, such description being given in conjunction with the accompanying drawings, wherein:

Figure 1 is a vertical sectional view of the carrier assembly and the tilting means therefore, and is taken upon the plane of the section line 1—1 of Figure 2, certain concealed portions of the structure being shown in dotted outline, with an alternate position of the carrier closure being shown in dot dash lines;

Figure 2 is a horizontal sectional view taken upon the plane of the section line 2—2 of Figure 1;

Figure 3 is a broken vertical sectional view taken upon the plane of section line 3—3 of Figure 1;

Figure 4 is an enlarged fragmentary elevational view of the end of the carrier assembly adjacent the tilting mechanism, this view being taken from the plane of the line 4—4 of Figure 1, and illustrates particularly the arrangement of the oppositely pivoted dogs and the latch releasing means;

Figure 5 is an enlarged fragmentary elevational view of the end of the tilting means looking in the opposite direction from the plane upon which Figure 4 is taken;

Figure 15:
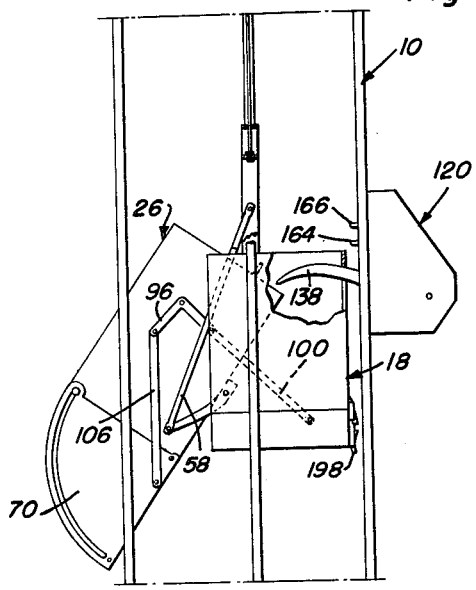
Figure 17:
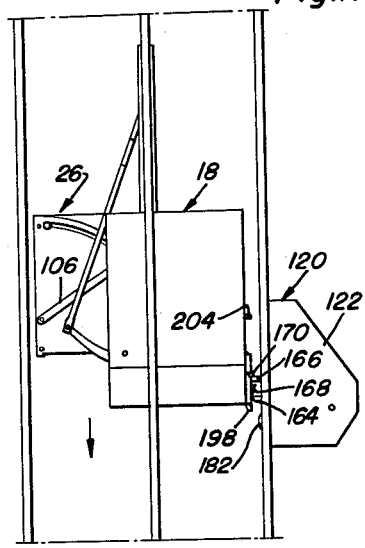
Figure 16:
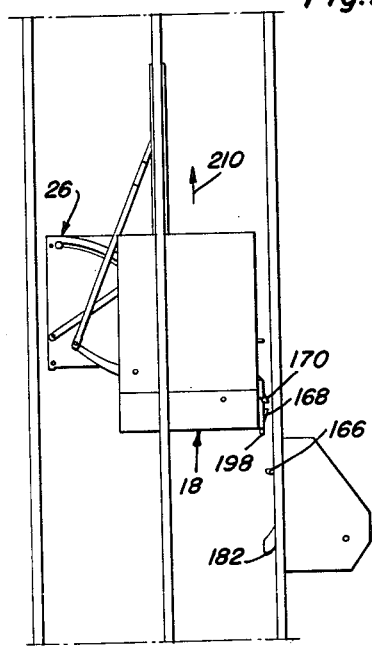
Figure 18:
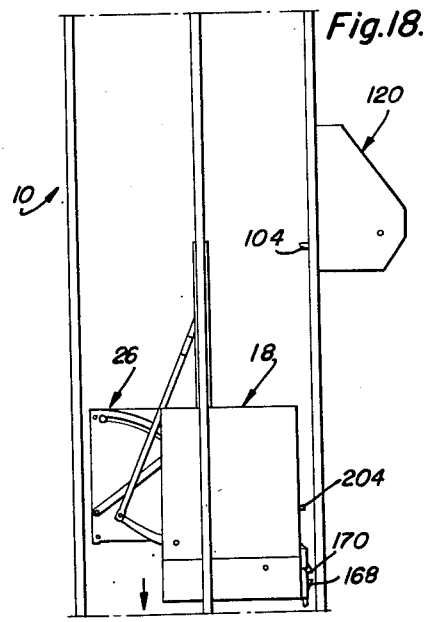

Figures 6 and 7 are vertical sectional detail views taken upon the planes of the sectional lines 6—6 and 7—7, respectively, of Figure 5;

Figure 8 is an enlarged sectional detail view taken upon the plane of the section line 8—8 in Figure 2;

Figure 9 is an enlarged sectional detail view taken upon the plane of the section line 9—9 in Figure 4;

Figure 10 is a broken sectional detail view taken upon the plane of the section line 10—10 of Figure 1;

Figures 11–14 are sequential side elevational views of the carrier discharging operation;

Figure 15 is a side elevational view of the carrier in dumping position;

Figure 16 is a side elevational view of the carrier raised above the discharging station; and Figures 17 and 18 are sequential views illustrating the downward passage of the carrier assembly pass the carrier discharging apparatus so as to not discharge the carrier of its contents.

Reference is now made more specifically to the accompanying drawings in which like numerals refer to similar parts throughout the various views, and wherein attention is first directed to the elevator support structure and to the carrier assembly construction.

Referring specifically to Figures 1–3, it will be seen that there is provided a more or less conventional elevator supporting structure 10 formed of rectangularly positioned vertical columns 12 and horizontal and diagonal brace members 14 and 16, respectively. It is within the space between the columns 12 that the elevator or carrier assembly designating generally at 18 is mounted for vertical movement.

The carrier assembly 18 comprises a carrier frame formed of a base 20, upstanding side walls 22 and an upstanding end wall 24. Disposed between and in spaced relation to the side walls 22 is a tiltable open ended carrier designated generally at 26. The carrier 26 includes a bottom wall 28, upstanding side walls 30 and an end wall 32. The carrier 26 is fixed intermediate its ends to the top of the web 34 of a U-shaped cradle that includes vertically inclined legs 36 disposed between the side walls 22 of the carrier support frame and the side walls 30 of the carrier 26. The legs 36 are, in turn, provided with trunnions 38 that are journalled in suitable bearings, not shown, in the side walls 22 of the carrier support frame, whereby the carrier 26 is tiltably supported by the carrier frame.

The elevator support structure has a pair of guide rails 40 fixed to the horizontal and diagonal brace members 14 and 16 thereof, which are slidably received in the vertical guide channels 42 fixed to the outer faces of the side walls 22 of the carrier support frame, whereby the assembly 18 is guided for vertical movement within the structure 10 as will be evident upon reference to Figure 2.

An inverted U-shaped member formed of a web 44 and legs 46 is provided, and the lower ends of the legs 46 are fixedly secured to the walls 22 in any suitable manner. The web 44 and the legs 46 are formed of inwardly opening channel shaped members and slidably received for vertical movement in the legs 46 are the legs 48 of an inverted U-shaped carrier support member including a connecting web 50 that is received in the web 44 to limit upward movement of the legs 48. An elevator cable 52 extends freely through a central aperture 54 provided in the web 44 and is terminally secured, as at 56, to the web 50. Conventional means, not shown, usually operable from ground level is of course provided for raising and lowering the elevator cable 52, whereby the assembly 18 may be raised and lowered as desired. A pair of links 58 are pivotally connected to the lower ends of the legs 48, as at 60, and are also pivotally connected to the outer ends of the legs 36, as at 62, the arrangement being such that the weight of the assembly 18, when applied to the cable 52, tends to rotate or tilt the carrier 26 in a clockwise manner (as viewed in Figure 1) about the trunnions 38 to the normal material holding position shown in Figure 1, since upward movement of the web 50 relative to the web 44 will cause such movement as will be appreciated.

A gate or closure construction 64 is provided for the open end of the carrier 26. Such construction 64 comprises corner posts 66 pivoted to the side walls 30 of the carrier 26 adjacent the lower edge of the open end thereof by a pivot 62 (see Fig. 10). Quadrant plates 70 are fixed to the posts 68 and are disposed in the space intermediate the side walls 22 on the side walls, such quadrant plates 70 being provided with arcuate slots 72 which slidably receive headed glide pins 74 carried by the side walls 30 to prevent the quadrant plates 70 from moving laterally from the side walls while permitting free pivotal movement thereof. The same pivot pin 68 that pivots the posts 66 upon the side walls 30 is also journalled through a suitable bearing opening provided in the lower portion of a closure member 76 received between the posts 66. The closure 76 is normally retained in fixed relation to the posts 66 to pivot therewith by latch constructions 78, it being understood that when the latch constructions 78 are unlatched the closure 76 may be swung outwardly from the carrier 26 to such an alternate position as shown at 80 in Figure 1.

The latch constructions 78 are identical so that a description of one will suffice for both, and as shown in Figure 8, a latch bolt 82 is reciprocably mounted in an apertured guide bosses 84 and 86 fixed to the closure 76. An actuating projection 88 is formed on the bolt 82 that extends upwardly from the closure 76 through a slot 90, therein. A coiled compression spring 92 embraces the bolt 82 and is seated between the boss 84 and the lateral projection 88 to yieldingly urge the bolt 82 into a keeper opening 94 provided in the adjacent post 66. It will be evident that with the parts in the position shown in Figure 3, the closure is latched to the posts 66 in such a manner as to swing outwardly from the walls 30 in unison with the posts and the quadrant plates 70. Means is provided to swing the closure 76 outwardly from the open end of the carrier 26 when the latter is tilted in an anti-clockwise direction as shown in Figure 1. Such means comprise bell cranks 96 centrally pivoted to the side walls 30 as at 98. A pair of links 100 are provided which are terminally pivoted to the base 20 at 102 and to one end of the bell crank 96 at 104, while another pair of links 106 are terminally pivoted to the other ends of the cranks at 108 and to the posts 66 at 110.

As best shown in Figures 1 and 2, latch means is provided to prevent tilting of the carrier 26. Such means comprises a rack shaft 112 rockably mounted on the base 20, said shaft being provided with a pair of angulated latch pins 114 that normally are engaged over a pair of oppositely extending legs 116 fixed to the carrier 26. Coiled torsion springs 118 are mounted to rock the shaft in a clockwise direction, as seen in Figure 1, so as to urge the pins 114 into latching engagement with the legs 116. The latch pins 114 and legs 116 are so shaped that when the carrier is rotated clockwise in the position shown in Figure 1, the legs 116 will cam the pins 114 to a sufficient extent to permit the legs 116 to pass below the angulated portions of the pins 114 so as to automatically latch the carrier 26 against tilting. The structure and manner in which the latch is released will be described presently.

Attention is now directed primarily to Figures 1, 2, 6 and 7 in connection with the following description of the structure for causing the automatic discharge of the carrier 26. Such structure is designated generally at 120 and comprises a frame of housing 122 that is removably secured to the elevator frame structure 10. The housing 122 includes side walls 124 and a front wall 126. A shaft 127 is journalled through the side walls 124 and has an eccentric 128 fixed thereto intermediate the walls 124. A slide 130 is mounted for horizontal reciprocation in channels 132 formed in the adjacent faces of the side walls 124 and is connected to the eccentric 128 by means of an eccentric strap 134 that embraces the eccentric 128 and is pivotally secured to the slide at 136, whereby rotation or oscillation of the shaft 127 will effect reciprocation of the slide 130. The slide 130 is bifurcated and pivotally receives therein an operating arm 138 that is pivoted thereto by a pivot pin 140. The structure and purpose of the arm 138 will be elaborated upon shortly.

A pair of sprockets 142 and 144 are fixed to the shaft 127 on opposite sides of the eccentric 128, and a pair of endless chains 146 and 148 are entrained over such sprockets respectively. The chain 146 is entrained over a pair of vertically spaced idler sprockets 150 and 152 that are suitably mounted in the housing 122 and the chain 148 is correspondingly entrained over a pair of vertically spaced idler sprockets 154 and 156. As clearly shown in Figures 6 and 7, the flights of each of the chains between the idler sprockets are parallel, vertical and arranged in the housing 122 to be closely spaced to the plane of the front wall 126, with the sprockets 150 and 152 so arranged that the vertical flight of the chain 146 is disposed to extend from a position adjacent the bottom of the housing 122 to a position spaced from the top thereof, and the sprockets 154 and 156 are so arranged that the vertical flight of the chain 148 extends from adjacent the top of the housing 122 to a position spaced from the bottom thereof. Slots 158 and 160 are provided in the front wall 126 in registry with the chains 146 and 148, respectively, and backing strips 162 are provided in the housing 122 for the vertical flights of the chains 146 and 148 to prevent inward movement thereof. For a purpose to become apparent presently, laterally projecting fingers 164 and 166 are secured to the chains 146 and 148, respectively, and extend through the slots 158 and 160.

As best shown in Figure 9, a pair of oppositely pivoted dogs 168 and 170 are secured in vertically spaced relation to the lower portion of the end wall 24 for cooperation with the fingers 164 and 166, a detailed sectional view of only the lowermost pivoted dog 168 being shown in Figure 9 as the dogs are identical in construction. As shown in Figure 9, the housing 172 for the dog 168 is secured to the wall 24 by any suitable means, such as the rivet 174. The dog 168 extends upwardly and outwardly from its pivot 176 and is yieldingly urged outwardly from the housing by a spring strip 178, such outwardly movement of the dog being limited by engagement of the dog 168 with the housing 172 at 180. The dog is arranged to have a travel path that coincides with the vertical portion of the travel path of the finger 164, so that it will be evident that on upward movement the dog 168 will engage the finger 164 and drive the latter upwardly until the same has moved into the housing 122 over the sprocket 150, while in downwardly movement of the dog 168, the same will simply ratchet over the finger 164 without moving the latter. The dog 170 is horizontally offset from the dog 168 and is arranged to have a travel path coinciding with the vertical travel path of the finger 166, however, since the dog is oppositely arranged with respect to the dog 168, the dog 170 will ratchet over the finger 166 on upward movement and drive the same downwardly on downward movement until the finger 166 is under the sprocket 156. The arrangement is such that upon upward movement of the carrier assembly 18 past the discharging structure 120, the dog will move the finger 164 upward from the position shown in Figure 6 until it passes over the sprocket 150, such movement of the finger 164 causing the slide 130 to move to the left as viewed in Figure 1 until the lower portion 182 of the operating arm 138 moves to a position outside the housing 122 through a slot 184 in the latter; such action occurring through the agency of the the chain 146, the sprocket 142, the shaft 127, the eccentric 128 and the eccentric strap 134 as will be evident. Such movement of the slide 130 will not of itself cause the upper end 186 of the arm 138 to move outside the housing 122 for the reason that a coiled compression spring 188 is biased between a stop 190 in the housing 122 and the lower portion 182 of the arm 138 to urge the latter in a clockwise direction as viewed in Figure 1.

It should also be noted at this time that such upward movement of the finger 164 over the sprocket 150 out of engagement with the dog 168 will leave the finger 166 some distance below the sprocket 154 with subsequent upwardly movement of the carrier assembly 18 simply causing the dog 170 to ratchet up past the finger 166, it being understood that the internal friction of the working parts of the structure 120 will prevent movement of the chains 146 and 148 unless either of the fingers 164 and 166 are positively engaged and driven by either of the dogs 168 and 170. In a similar manner, downward movement of the chain 148 by the dog 170 will move the parts of the structure 120 to the positions shown thereof in Figures 1, 6 and 7, it being noted that after the finger 166 passes under the sprocket 156, the dog 168 ratchets over the finger 164 that is a short interval above the sprocket 152.

Reference is now made to the means for automatically releasing the latch pins 114 from the legs 116. As will be seen presently such automatic operation can only occur when the slide 130 is moved to the left of the position shown in Figure 1 to such an extent that the lower portion 182 of the arm 138 is outside the housing 122 and, accordingly, the two following paragraphs describe such latch releasing means with such a position of the slide 130 assumed.

A crank arm 192 having a bifurcated outer end that projects through an opening 194 in the wall 24 is secured to the rock shaft 112 in such a manner that upward movement of the outer end of the arm 192 acts against the springs 118 and causes rotation of the shaft 112 to release the latch pins 114 from the legs 116. A vertical hollow enclosure member 196 is secured to the wall 24 into which the outer end of arm 192 projects. An actuating element 198 is slidably received in the member 196 for vertical movement and is bifurcated at its upper end to receive the bifurcated outer end of the arm 192, a pin 200 carried by the element 198 slidably extending through the furcation in the arm 192, the arrangement being such that upward movement of the element 198 will raise the arm 192.

An internal wall of the member 196 is inclined, as at 202, so that the element 198 normally extends downwardly and outwardly from the bottom of the member 196 toward the carrier discharging structure 120. In operation, downward movement of the carrier assembly 18 will cause the element 198 to engage the lower portion 182 of the arm 138 in such a manner that the element 198 moves upward relative to the carrier assembly 18 to unlatch the legs 116 as described, and to cause anti-clockwise pivotal movement of the arm 138 about its pivot 140.

Such pivotal movement of the arm 138 causes the upper end 186 of the arm 138 to move into the travel path of a stop 204 that is carried by the wall 32 of the carrier 26 which projects through an elongated vertical slot 206 in the wall 24. Upon engagement of the stop 204 with the top 186 of the arm 138 and further downward movement of the carrier assembly 18, the carrier 26 is caused to tilt in an anti-clockwise direction as will be evident upon inspection of Figure 1, it being noted that the arm 138 will pivot automatically to remain in engagement with the stop 204. It will be noted that the arm 138 will extend into the slot 206, and it is obvious that downward movement of the carrier assembly 18 is positively limited to a position relative to the structure 120 at which the upper extremity of the slot 206 reaches the arm 138.

Such tilting movement of the carrier 26 caused by the arm 138 is attended by the previously described action of the closure 76, so that the contents, not shown, of the carrier 26 will be discharged into any appropriate receiving chute of conventional character, not shown, and is arranged at a suitable level with respect to the elevation of the discharging structure 120. After the carrier 26 is discharged, the cable 52 is raised causing the links 58 to return the carrier 26 to its normal position with the spring 188 returning the arm 138 to its normal position. Upward movement of the carrier assembly 18 disengages the element 198 from the arm 132 to permit the latch pins 114 to latch the legs 116, as will be understood.

It is of the utmost importance to the present invention that the carrier 26 is not discharged upon every occasion that the same passes downwardly past the discharging structure 120, and that such discharging operation will occur when and only when the carrier assembly 18 is moved in a predetermined manner relative to the discharging structure 120.

As mentioned previously, upward movement of the carrier assembly 18 will cause the dog 168 to move the finger 164 over the top of the sprocket 150. When the finger has been moved to such a position, the slide 130 is in the above described position so that the carrier discharging operation will occur upon downward movement of the carrier assembly, unless such downward movement that would normally discharge the carrier 26, causes the slide 130 to move to the position shown thereof in Figure 1, it being apparent that with the parts in the position shown in Figure 1, discharging will not occur because the lower portion 182 of the arm 138 is out of the travel path of the element 198. It is the purpose of the dog 170, the finger 166 and the chain 148 to move the parts of the structure 120 to the inoperative position shown thereof in Figure 1, in response to such downward movement, when desired.

The dogs 168 and 170 and the fingers 164 and 166 are so arranged that at the instant that the finger 164 is over the top of the sprocket 150, as caused by upward movement of the carrier assembly 18, the dog 170 is spaced below the finger 166 and is not engaged over the top thereof, so that the discharging structure 120 may be set in a cocked position. Clearly then, the structure 120 is always placed in the cocked position any time the carrier assembly 18 proceeds upwardly past the same.

The carrier 26 will be discharged in the manner stated earlier if the assembly 18 is lowered relative to the structure 120 when the latter is in the cocked position except when the carrier assembly 18 has been raised to such an extent that the dog 170 ratchets over the top of the finger 166. If the dog 170 has ratcheted over the top of the finger 166, subsequent downward movement of the carrier assembly 18 will cause the parts of the structure 120 to return to the inoperative position shown thereof in Figure 1, due to the interaction of the dog 170 and the finger 166, so that such downward movement of the carrier assembly 18 will not cause the structure 120 to discharge the carrier 26.

Thus, it will be seen that the carrier assembly 18 will be free to pass upwardly past the structure 120 at any time without being affected thereby. If after passing entirely above the structure 120 (so that the dog 170 has ratcheted over the top of the finger 166), the carrier assembly 18 may be lowered past the structure 120 without being affected thereby. However, if the carrier assembly 18 moves upwardly to a limited extent by the structure (so that the finger 164 is moved over the top of the sprocket 150 and not enough to engage the dog 170 over the finger 166), subsequent downwardly movement of the carrier assembly 18 will cause the structure 120 to discharge carrier 26 as described previously.

Figure 11:
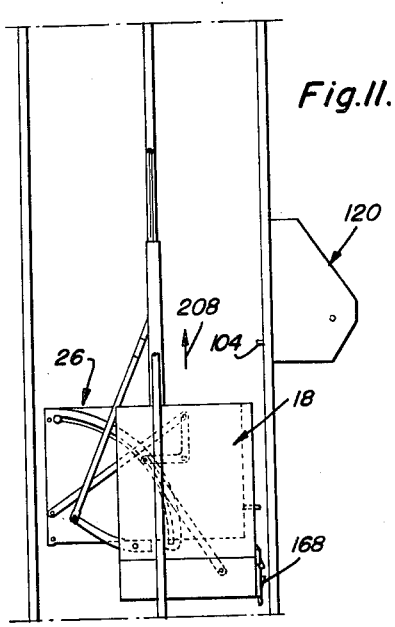
Figure 13:
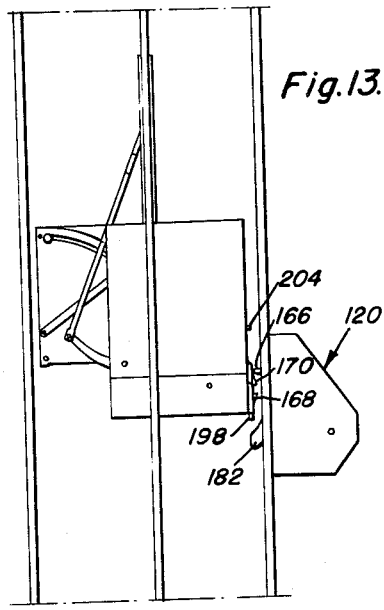
Figure 12:
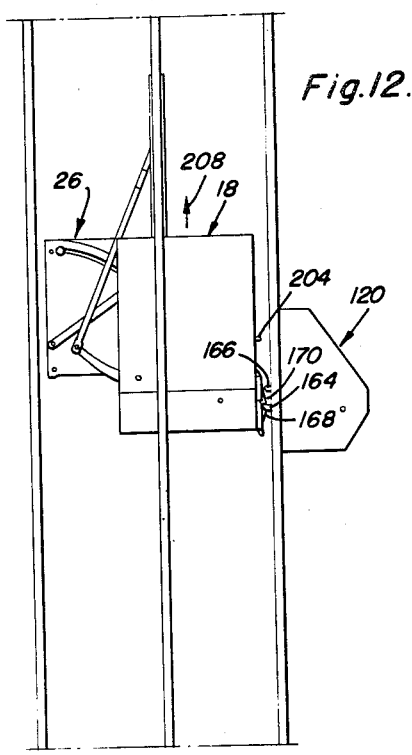
Figure 14:
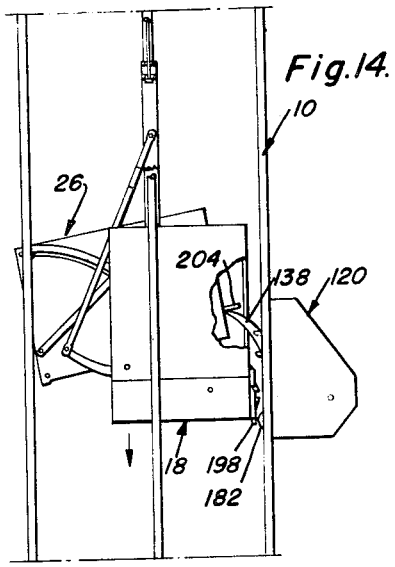

The entire sequence of the steps necessary with the above described apparatus to discharge the carrier 26 are shown in Figures 11–16. In Figure 11, the carrier assembly 18 is disposed below the structure 120, with the parts of the latter being in the positions shown thereof, in Figures 1, 6 and 7. The assembly 18 is moved upwardly as indicated by the arrow 208, and Figure 12 shows the relation of the components after the dog 168 has engaged the finger 164 and moved the same a short interval. Further upward movement of the assembly 18 cocks the structure 120 as shown in Figure 13, it being noted that the lower portion 182 of the arm 138 now projects from the housing 122, and that the dog 170 is not engaged over the top of the finger 166. Upon lowering the assembly 18 from the position shown in Figure 14, the element 198 has contacted the portion 182 of the arm 138 to unlatch the carrier 26, and the arm 138 has engaged the stop 204 and partially tilted the carrier 26. The assembly 18 is shown at a still further lowered position in Figure 15, and it will be noted that the arm 138 now positively prevents further descent of the assembly 18. From the position shown in Figure 15, the assembly may be raised as indicated by the arrow 210 in Figure 16, which returns the carrier 26 to its normal position while leaving the structure 120 in the same condition as though the assembly 18 had proceeded directly thereby without pausing to discharge.

Figures 17 and 18 illustrate the manner in which the assembly 18 may be passed downwardly past the structure 120 without dumping and may be considered subsequent sequential positions of the assembly 18 upon being lowered from the position shown thereof in Figure 16. Since the dog 170 overlies the finger 166, downward movement of the assembly 18 as shown by the arrow 212 in Figures 17 and 18 causes the lower portion 182 of the arm 138 to be retracted into the housing 122 of the structure 120 to be out of the travelled path of the element 198.

It will be readily appreciated that any number, and in fact in use of the invention a plurality of discharging structures 120 are disposed at vertically spaced desired alternative discharging positions along the travel path of the assembly 18. Obviously, the operator may move material from any position above or below the desired discharge position and discharge the same at said desired discharge position. Only the selected discharge station 120 is actuated to discharge the carrier 26 in response to a predetermined movement of the assembly 18 relative to the selected discharge structure 120.

The independent pivotal movement of the closure 76 when the latches 78 are released permit the carrier 26 to be readily loaded at any level including ground level.

The operator will in the usual building construction set up, operate or control the vertical movements of the assembly 18 from ground level, and the invention may utilize suitable signal circuits, not shown, to apprise the operator of the position of the assembly relative to a plurality of structures 120, and particularly in relation to the position of the assembly 18 relative to a selected structure 120 at the critical interval when the dog 170 is moving to ratchet over a finger 166. However, those skilled in the art will be readily aware of how the construction may be modified to permit the operator of the assembly 18 to travel with the assembly.

It is of paramount importance to note that the instant invention is not in any sense limited to a carrier suitable for use only in vertical travelling movements. Whatever part played in the operation of the present invention by the force of gravity may be readily supplanted by suitable cables pulling upon the assembly 18, such as by attaching a cable not shown, to the base 20 to oppose the action of the cable 52. More definitely, the present invention is thought to be capable of modification, particularly in the concept of cocking and uncocking of the discharge structure 120, as to render the same capable of selectively discharging railroad coal cars at selected receiving stations solely in response to predetermined horizontal movements of a train of such cars.

From the foregoing, the construction and operation of the machine will be readily understood and further explanation is believed to be unnecessary. However, since numerous modifications and changes will readily occur to those skilled in the art, it is not desired to limit the invention to the exact construction shown and described, and accordingly all suitable modifications and equivalents may be resorted to, falling within the scope of the appended claims.

Having described the invention, what is claimed as new is:

1. In an elevator, a movable carrier including a tiltable construction for holding materials, guide means for the carrier, a vertical operating arm pivotally connected intermediate its ends to the guide means for vertical swinging movement of its lower end into the path of movement of the carrier latch means normally retaining the tiltable construction of the carrier against tilting, release means on said carrier for said latch means operated by engagement with said lower end upon downward movement of the carrier, said tiltable construction including a portion engageable with the upper end of the arm to tilt such construction upon downward movement of the carrier, said arm being responsive to the release means engaging the lower portion of the arm during downward movement of the carrier to pivot the arm to a position in which the upper end of the arm is disposed in the path of movement of said portion of the tiltable construction.

2. In an elevator, a movable carrier including a tiltable construction for holding materials, guide means for the carrier, a vertical operating arm pivotally connected intermediate its ends to the guide means for vertical swinging movement of its lower end into the path of movement of the carrier, latch means normally retaining the tiltable construction of the carrier against tilting, release means on said carrier for said latch means operated by engagement with said lower end upon downward movement by said carrier, said tiltable construction including a portion engageable with the upper end of the arm to tilt such construction upon downward movement of the carrier, said arm being responsive to the release means engaging the lower portion of the arm during downward movement of the carrier to pivot the arm to a position in which the upper end of the arm is disposed in the travel path of said portion of the tiltable construction, and means for shifting the axis of the arm towards and away from the path of movement of the carrier so that the lower portion of the arm may be moved from the path of movement of the carrier.

3. In an elevator, a movable carrier including a tiltable construction for holding materials, guide means for the carrier, a vertical operating arm pivotally connected intermediate its ends to the guide means for vertical swinging movement of its lower end into the path of movement of the carrier, latch means normally retaining the tiltable construction of the carrier against tilting, release means on said carrier for said latch means operated by engagement with said lower end upon downward movement by the carrier, said tiltable construction including a portion engageable with the upper end of the arm to tilt such construction upon downward movement of the carrier, said arm being responsive to the release means engaging the lower portion of the arm during downward movement of the carrier to pivot the arm to a position in which the upper end of the arm is disposed in the path of movement of said portion of the tiltable construction, and means responsive to predetermined vertical movements of the carrier relative to the guide means for shifting the pivot of the arm towards and away from the path of movement of the carrier so that the lower portion of the arm may be moved from the path of movement of the carrier.

4. In an elevator, a movable carrier including a tiltable construction for holding materials, guide means for the carrier, an operating arm pivotally connected intermediate its ends to the guide means for vertical swinging movement about a horizontal axis, said tiltable construction including a portion engageable with the upper end of the arm to tilt such construction upon lowering the carrier, the upper end of said arm being normally disposed out of the travel path of said portion, means for moving the upper end of the arm into the travel path of said portion of the tiltable construction comprising an element on the carrier having a travel path to permit such element to engage the lower portion of the arm and move the latter about its axis, and means for shifting the axis of the arm towards and away from the travel path of the carrier, whereby the entire arm may be moved from the travel path of said portion of the tiltable construction and the travel path of said element.

5. In an elevator, a movable carrier including a tiltable construction for holding materials, guide means for the carrier, an operating arm pivotally connected intermediate its ends to the guide means for vertical swinging movement about a horizontal axis, said tiltable construction including a portion engageable with the upper end of the arm to tilt such construction upon lowering the carrier, the upper end of said arm being normally disposed out of the travel path of said portion, means for moving the upper end of the arm into the travel path of said portion of the tiltable construction comprising an element on the carrier having a travel path to permit such element to engage the lower portion of the arm and move the latter about its axis, and means operated by movement of the carrier relative to the guide means for shifting the axis of the arm towards and away from the travel path of the carrier, whereby the entire arm may be moved from the travel path of said portion of the tiltable construction and the travel path of said element.

6. In an elevator, a movable carrier including a tiltable construction for holding materials, guide means for the carrier, an operating arm pivotally connected intermediate its ends to the guide means for vertical swinging movement above a horizontal axis, said tiltable construction including a portion engageable with the upper end of the arm to tilt such construction upon lowering the carrier, the upper end of said arm being normally disposed out of the travel path of said portion, means for moving the upper end of the arm into the travel path of said portion of the tiltable construction comprising an element on the lower portion of the arm and move the latter about its axis, and means responsive to predetermined movement of the carrier relative to the guide means for shifting the axis of the arm towards and away from the travel path of the carrier, whereby the entire arm may be moved from the travel path of said portion of the tiltable construction and the travel path of said element, said last means including a slide carried by the guide means movable towards and away from the travel path of the carrier, a rotatable shaft operatively connected to the slide, a pair of sprockets on the shaft, a pair of endless chains entrained on the sprockets and each having a portion thereof parallel and adjacent to the travel path of the carrier, fingers on such portions of the chains, and oppositely pivoted dogs on the carrier engageable with the fingers.

7. In elevator apparatus, means for causing a vertically movable carrier to discharge its contents comprising a frame mountable on elevator support and guide structure, a slide mounted on the frame for horizontal reciprocation, a shaft journaled in the frame for rotation about a horizontal axis, cam means operatively connecting the shaft and the slide for moving the latter in response to rotation of the shaft, a pair of sprockets fixed on the shaft, an endless chain entrained over each of the sprockets, guide means carried by the frame for guiding portions of the chains along parallel vertical paths, a finger on each of the chains for engagement with cooperating elements of a carrier whereby the chains may be moved to rotate the shaft and move the slide, and an operating arm pivoted to the slide for vertical swinging movement.

8. In elevator construction, a vertically movable carrier assembly and support and guide means therefor, said assembly including a carrier support frame and a tiltable carrier pivotally mounted thereon, said carrier being tiltable from a normal material supporting position to a material discharging position, latch means carried by the carrier support frame for retaining the carrier in its normal material supporting position, means carried by the first mentioned means for unlatching the latch means and also for tilting the carrier to material discharging position upon suitable movement of the assembly comprising an auxiliary frame, a slide mounted on the auxiliary frame for horizontal reciprocation towards and away from the travel path of the assembly, a shaft journaled in the auxiliary frame for rotation about a horizontal axis, cam means operatively connecting the shaft and the slide for moving the latter in response to rotation of the shaft, a pair of sprockets fixed on the shaft, an endless chain entrained over each of the sprockets, a guide means carried by the auxiliary frame for guide portions of the chains along parallel vertical paths adjacent the travel path of the assembly, a finger on each of the chains, oppositely pivoted dogs on the support frame engageable with the fingers during travel of the assembly, said chains, said fingers and said dogs being so constructed and arranged that upward movement of the assembly will cause the slide to be moved towards the travel path of the assembly and downward movement of the assembly will cause the slide to move away from the travel path only when the assembly moves downwardly past a predetermined position, an operating arm pivoted to the slide for vertical swinging movement, means normally urging the lower portion of the arm that is below said axis towards the travel path of the means for unlatching the latch means, the carrier including a portion engageable with the upper end of the arm to tilt the carrier upon downward movement of the assembly, whereby the unlatching means engages the lower portion of the arm, when the slide is adjacent the travel path of the assembly, to unlatch the latch means and also to pivot the upper end of the arm into the travel path of said portion of the carrier.

References Cited in the file of this patent

UNITED STATES PATENTS

| Number | Name | Date |
|---|---|---|
| 809,456 | Newmen | Jan. 9, 1906 |
| 888,434 | Weaver | May 19, 1908 |
| 1,776,414 | Carlson | Sept. 23, 1930 |
| 2,011,656 | Sill | Aug. 20, 1935 |
| 2,121,121 | Dempster | June 21, 1938 |

FOREIGN PATENTS

| Number | Country | Date |
|---|---|---|
| 590,159 | France | Mar. 11, 1925 |
| 238,076 | Great Britain | Aug. 13, 1925 |
| 450,828 | Germany | Oct. 18, 1927 |